(12) United States Patent
Dan

(10) Patent No.: US 8,413,174 B2
(45) Date of Patent: Apr. 2, 2013

(54) DRIVER CONTROLLING DEVICE, AND COMPUTER-READABLE RECORDING MEDIUM STORING DRIVER CONTROLLING PROGRAM

(75) Inventor: Koji Dan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 130 days.

(21) Appl. No.: 13/119,441

(22) PCT Filed: Sep. 14, 2009

(86) PCT No.: PCT/JP2009/066469

§ 371 (c)(1),
(2), (4) Date: Mar. 17, 2011

(87) PCT Pub. No.: WO2010/032858

PCT Pub. Date: Mar. 25, 2010

(65) Prior Publication Data

US 2011/0179426 A1 Jul. 21, 2011

(30) Foreign Application Priority Data

Sep. 17, 2008 (JP) .................................. 2008-237792

(51) Int. Cl.
*G06F 3/00* (2006.01)
(52) U.S. Cl. ........................................ 719/327; 719/321
(58) Field of Classification Search .................. 719/327, 719/321
See application file for complete search history.

(56) References Cited

U.S. PATENT DOCUMENTS

| | | | | |
|---|---|---|---|---|
| 7,908,609 B2 * | 3/2011 | Mitsui | ........................... | 719/321 |
| 7,940,407 B2 * | 5/2011 | Suzuki et al. | ................. | 358/1.15 |
| 8,085,417 B2 * | 12/2011 | Funamizu | .................... | 358/1.15 |
| 2004/0213614 A1 | 10/2004 | Uchida | | |
| 2007/0300216 A1 | 12/2007 | Miyagi | | |

FOREIGN PATENT DOCUMENTS

| | | |
|---|---|---|
| JP | 2001 159959 | 6/2001 |
| JP | 2003 23537 | 1/2003 |
| JP | 2004 287496 | 10/2004 |
| JP | 2004 326603 | 11/2004 |
| JP | 2005 258721 | 9/2005 |
| JP | 2006 1135 | 1/2006 |
| JP | 2006 268643 | 10/2006 |
| JP | 2008 3784 | 1/2008 |

OTHER PUBLICATIONS

Gerald G. Pechanek, Digital Neural Emulators Using Tree Accumulation and Communication Structures, Nov. 1992.*

International Search Report issued Dec. 28, 2009 in PCT/JP09/066469 filed Sep. 14, 2009.

\* cited by examiner

*Primary Examiner* — Lechi Truong

(74) *Attorney, Agent, or Firm* — Oblon, Spivak, McClelland, Maier & Neustadt, L.L.P.

(57) ABSTRACT

A driver controlling device is disclosed. A UI module stores information of supportable functions of drivers in a function table, and obtains information of functions of a model of a new driver to be used described in model dependent data of the new driver. The UI module determines whether the obtained information of the functions of the new driver has been stored in the information of the supportable functions. When the obtained information of the functions of the new driver has not been stored in the information of the supportable functions, the UI module stores the information of the functions of the new driver which has not been stored in the information of the supportable functions in a un-supporting function list and prevents the new driver from using the information of the functions in the un-supporting function list.

6 Claims, 6 Drawing Sheets

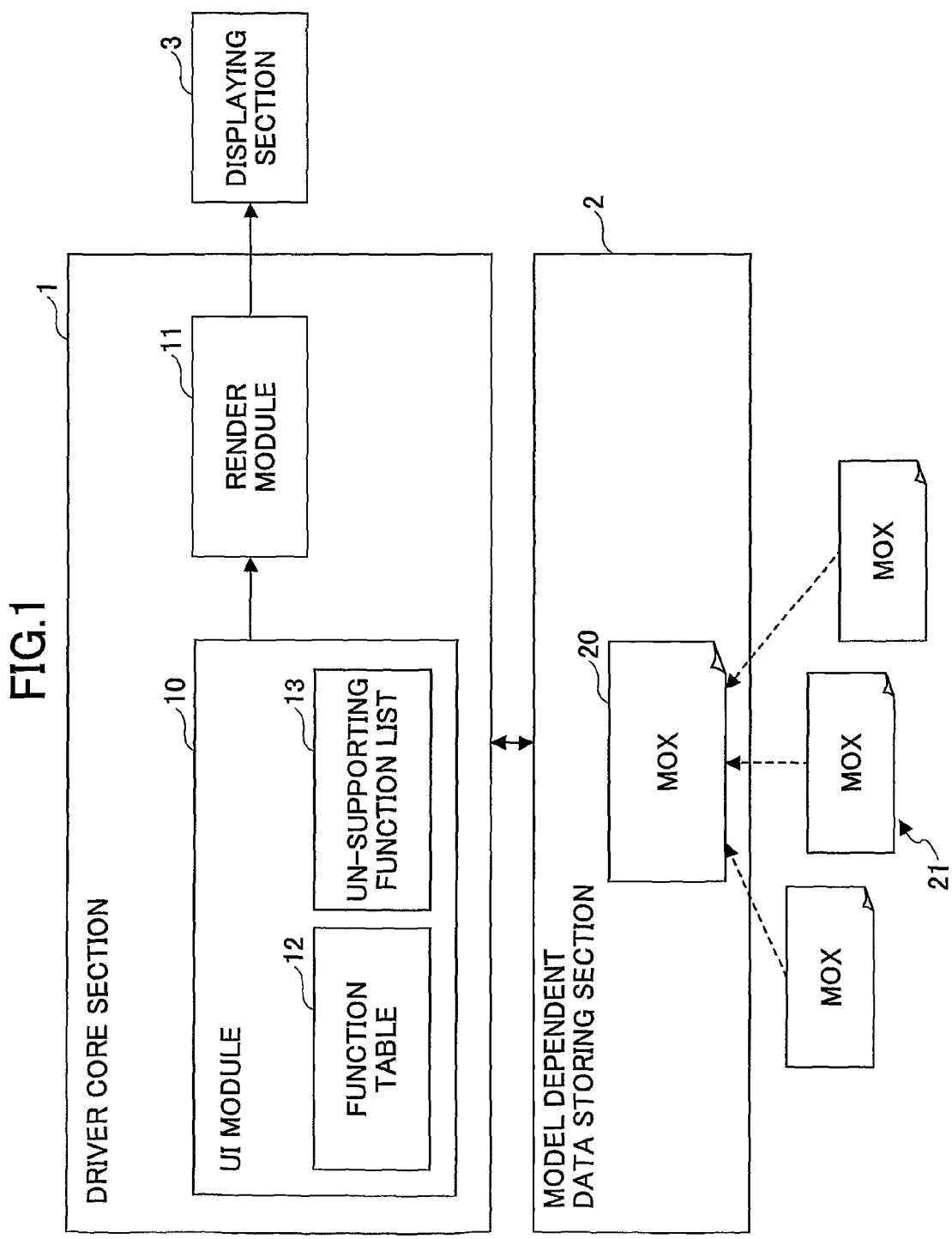

FIG.2

```xml
<?xml version="1.0" encoding="utf-8"?>
<printer model="XXXXX YYYYY MP C4500" ver="1.00" moxtype="MOX-UD">
    <metadata>
        <metafeature mid="string">string</metafeature>
    </metadata>
    <LayoutSettings>
        <CArea>
            <feature id="UIJobType"/>           ─30
            <feature id="PageSize"/>
            <feature id="InputSlot"/>
            <feature id="MediaType"/>
            <feature id="dmCopies"/>
        </CArea>
        <DArea>
            <SubTab icon="JobSetup">            ─31
                <feature id="UIJobType"/>
            </SubTab>
            <SubTab icon="Basic">               ─32
                <feature id="Spacel"/>
                <feature id="dmCopies"/>
                <feature id="dmScale"/>
            </SubTab>
            <SubTab icon="Paper">               ─33
                <feature id="InputSlot"/>
                <feature id="MediaType"/>
            </SubTab>
        </DArea>
        <Gamma>                                 ─34
            <feature id="DefTab"/>
            <feature id="DefSubTab"/>
            <feature id="OCIconview"/>
            <feature id="CurModel"/>
        </Gamma>
    </LayoutSettings>
</printer>
```

DRIVER CONTROLLING DEVICE, AND COMPUTER-READABLE RECORDING MEDIUM STORING DRIVER CONTROLLING PROGRAM

TECHNICAL FIELD

The present invention generally relates to a driver controlling device and a computer-readable recording medium storing a driver controlling program, in which drivers to drive apparatuses such as a facsimile apparatus, a printer, a copying apparatus, a multifunctional peripheral including a facsimile transmitting and receiving function, a printing function, a copying function, and a peripheral of a computer are controlled.

BACKGROUND ART

When a PC (personal computer) drives an apparatus, for example, a facsimile apparatus, a printer, a copying apparatus, a multifunctional peripheral including a facsimile transmitting and receiving function, a printing function, a copying function, and so on; or a peripheral of a computer; a driver for driving the apparatus must be installed in the PC.

For example, when a PC uses a printer, a printer driver for driving the printer must be installed in the PC. That is, when a new PC is connected to a network to which many PCs have been connected and the new PC uses a printer, a new printer driver for driving the printer must be installed in the PC (for example, see Patent Document 1).

In a case where a new printer driver is installed in a new PC at each time when the new PC is connected to a network, many labor hours are required to verify the system environment of the network, and the number of the printer drivers is increased when the new printer is installed in the network.

In order to solve the above problem, a universal driver has been proposed. In the universal driver, a function table which is supported by a driver core section is formed, and when a new driver must be installed, the function table is referred to and all functions of the new driver are supported by updating the function table without installing the new driver.

[Patent Document 1] Japanese Unexamined Patent Publication No. 2004-287496

However, in the conventional universal driver, since the all functions of the new driver are supported by the driver core section, every time when the new driver must be installed, the function table which is supported by the driver core section must be updated. Consequently, a user must expend labor hours for verifying the driver substantially the same as the labor hours expended when the driver version is upgraded.

SUMMARY OF INVENTION

In an embodiment of the present invention, there is provided a driver controlling device and a computer-readable recording medium storing a driver controlling program, in which labor hours for verifying un-supporting functions of a new driver are not expended in the driver controlling device.

To achieve one or more of these and other advantages, according to one aspect of the present invention, there is provided a driver controlling device. The driver controlling device includes a supporting function storing unit which stores information of supportable functions of drivers in a function table, a function obtaining unit which obtains information of functions of a new driver to be used described in model dependent data of the new driver, a determining unit which determines whether the information of the functions obtained by the function obtaining unit has been stored in the function table, a registering unit which registers information of a function that has not been stored in the function table determined by the determining unit in an un-supporting function list, and a preventing unit which prevents the new driver from using information corresponding to the information of the function which has been registered by the registering unit.

According to an embodiment of the present invention, since a driver controlling device prevents a function from being used when the driver controlling device does not support the function, unwanted labor hours to verify a new function which is not supported for a user are not expended.

The features and advantages of the present invention will become more apparent from the following detailed description of a preferred embodiment given with reference to the accompanying drawings.

BRIEF DESCRIPTION OF DRAWINGS

FIG. 1 is a block diagram showing a driver controlling device according to an embodiment of the present invention;

FIG. 2 is a diagram showing an example of contents of an MOX shown in FIG. 1;

MODE(S) FOR CARRYING OUT THE INVENTION

Figure 3:
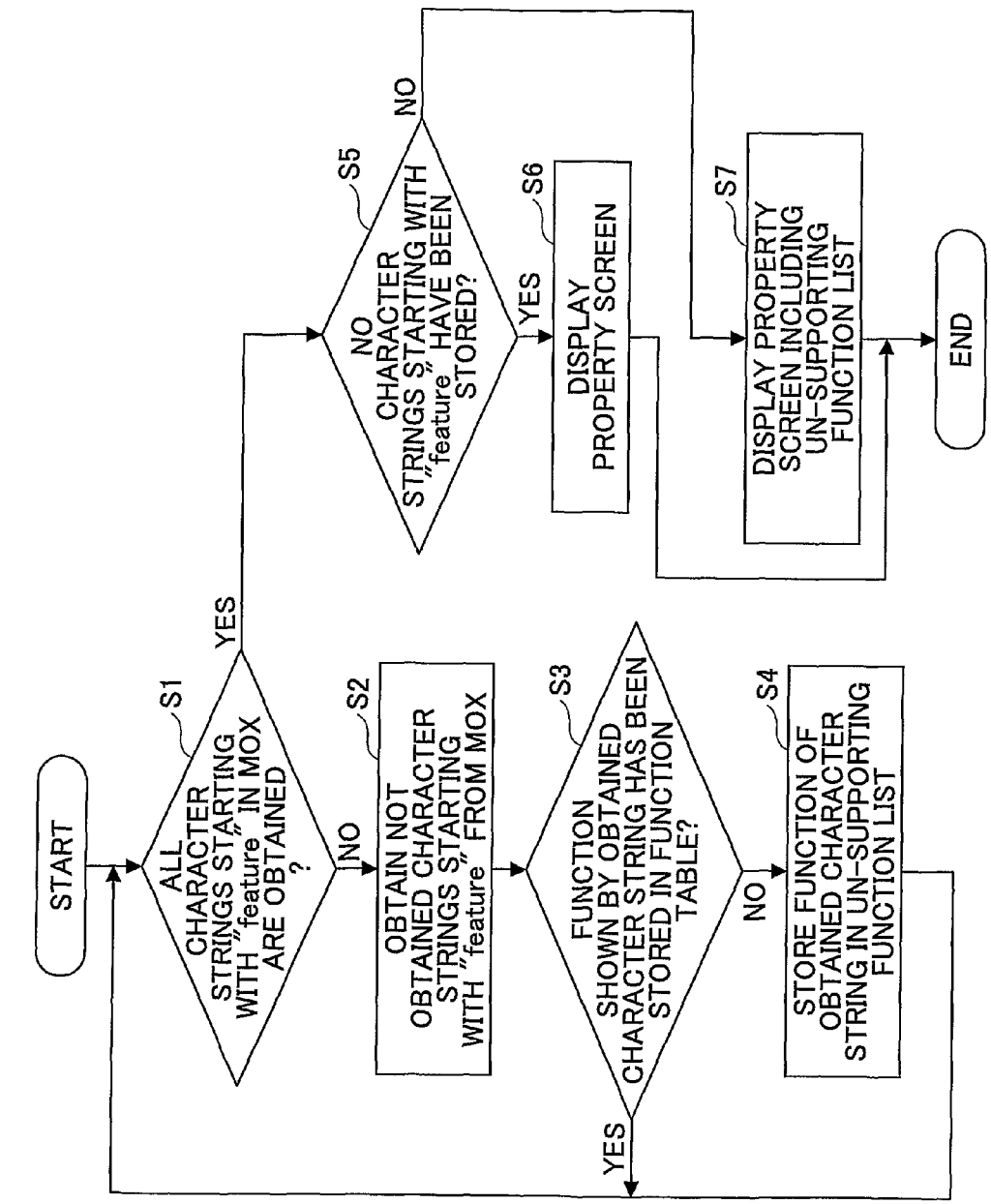
FIG. 3 is a flowchart showing displaying processes of a user interface in the driver controlling device shown in FIG. 1.

Referring to the drawings, an embodiment of the present invention is described in detail.

FIG. 1 is a block diagram showing a driver controlling device according to the embodiment of the present invention.

The driver controlling device installs a driver controlling program in a PC (not shown). When a CPU (central processing unit) of the PC executes the driver controlling program, functions of a driver core section 1 and a model dependent data storage unit 2 are realized.

The driver core section 1 includes a UI (user interface) module 10 and a render module 11. The UI module 10 interfaces with the CPU of the PC, in which a driver of, for example, a printer, or a copying apparatus has been installed, to control the driver, and interfaces with a user. The UI module 10 includes a function table 12 and an un-supporting function list 13.

The UI module 10 (a supporting function storing unit) stores information of supportable functions of drivers in the function table 12.

The model dependent data storage unit 2 stores an MOX 20 which has model dependent (specific) data of each driver (information of functions of the driver). The function table 12 stores information of functions of the drivers which can be supported by the UI module 10 of the driver core section 1. The UI module 10 (a registering unit) stores (registers) information of functions which are not supported by the driver core section 1 of functions of the driver which is used by the PC in the un-supporting function list 13, based on the information stored in the MOX 20 and the information stored in the function table 12. In addition, the UI module 10 (a preventing unit) prevents the driver from using the un-supporting functions. Further, the UI module 10 sends information for forming a property screen (a user interface) to the render module 11 so that a user can determine several settings for functions of the driver.

The render module 11 forms display data to be displayed on the property screen from the information sent from the UI module 10, and causes a displaying section 3 of the PC to display the property screen.

The model dependent data storage unit 2 stores the MOX 20 which has the model dependent data of each driver model. When the driver model is changed to another driver model which is used by the PC, the MOX 20 is changed to an MOX 21. Therefore, the number of the MOXs is the number of driver models.

Next, the MOX 20 (model dependent data) is described. FIG. 2 is a diagram showing an example of contents (data) of the MOX 20.

As described above, the MOX 20 has the model dependent data of each driver in which the information of functions of the driver is described.

In FIG. 2, a character string of each line starting with "feature" in regions surrounded by rectangular frames 30, 31, 32, 33 and 34 shows a function of a driver. The UI module 10 extracts the character string of the line starting with "feature" and the UI module 10 (a determining unit) of the driver core section 1 determines whether the extracted character string (function) is an un-supporting function.

Next, displaying processes of a user interface in the driver controlling device shown in FIG. 1 are described.

FIG. 3 is a flowchart showing the displaying processes of the user interface in the driver controlling device shown in FIG. 1.

First, the UI module 10 determines whether all character strings of all lines starting with "feature" in the MOX 20 of the model dependent data storage unit 2 are obtained (S1). When all character strings of all lines starting with "feature" in the MOX 20 of the model dependent data storage unit 2 are not obtained (NO in S1), the UI module 10 obtains a not-obtained character string of a line starting with "feature" from the MOX 20 in the model dependent data storage unit 2 by referring to the first line in the MOX 20 (S2). That is, the UI module 10 (a function obtaining unit) obtains information of functions from the MOX 20.

The UI module 10 determines whether a function shown by the obtained character string of the line has been stored in the function table 12 (S3). When a function shown by the obtained character string of the line has been stored in the function table 12 (YES in S3), the process returns to S1, and the processes from S1 through S3 are repeated. When a function shown by the obtained character string of the line has not been stored in the function table 12 (NO in S3), the UI module 10 additionally stores the function of the obtained character string of the line in the un-supporting function list 13 (S4). Then the process returns to S1 and the processes from S1 through S4 are repeated.

When all character strings of all lines starting with "feature" in the MOX 20 of the model dependent data storage unit 2 are obtained (YES in S1), the UI module 10 determines whether no character strings starting with "feature" have been stored in the un-supporting function list 13 (S5). That is, the UI module 10 determines whether the un-supporting function list 13 is empty. When no character strings starting with "feature" have been stored in the un-supporting function list 13 (YES in S5), the UI module 10 sends information of the MOX 20 to the render module 11, and the render module 11 forms display data to be displayed on the property screen from the information of the MOX 20 sent from the UI module 10, and causes the displaying section 3 of the PC to display the property screen (S6).

When one or more character strings starting with "feature" have been stored in the un-supporting function list 13 (NO in S5), the UI module 10 sends information of the MOX 20 and information of the un-supporting function list 13 to the render module 11; and the render module 11 forms display data to be displayed on the property screen from the information of the MOX 20 and the un-supporting function list 13 sent from the UI module 10, and causes the displaying section 3 (a displaying unit) of the PC to display the property screen including the un-supporting function list (S7).

Next, display processes of the property screen (user interface) in the driver controlling device are described by referring to display examples.

Figure 4:
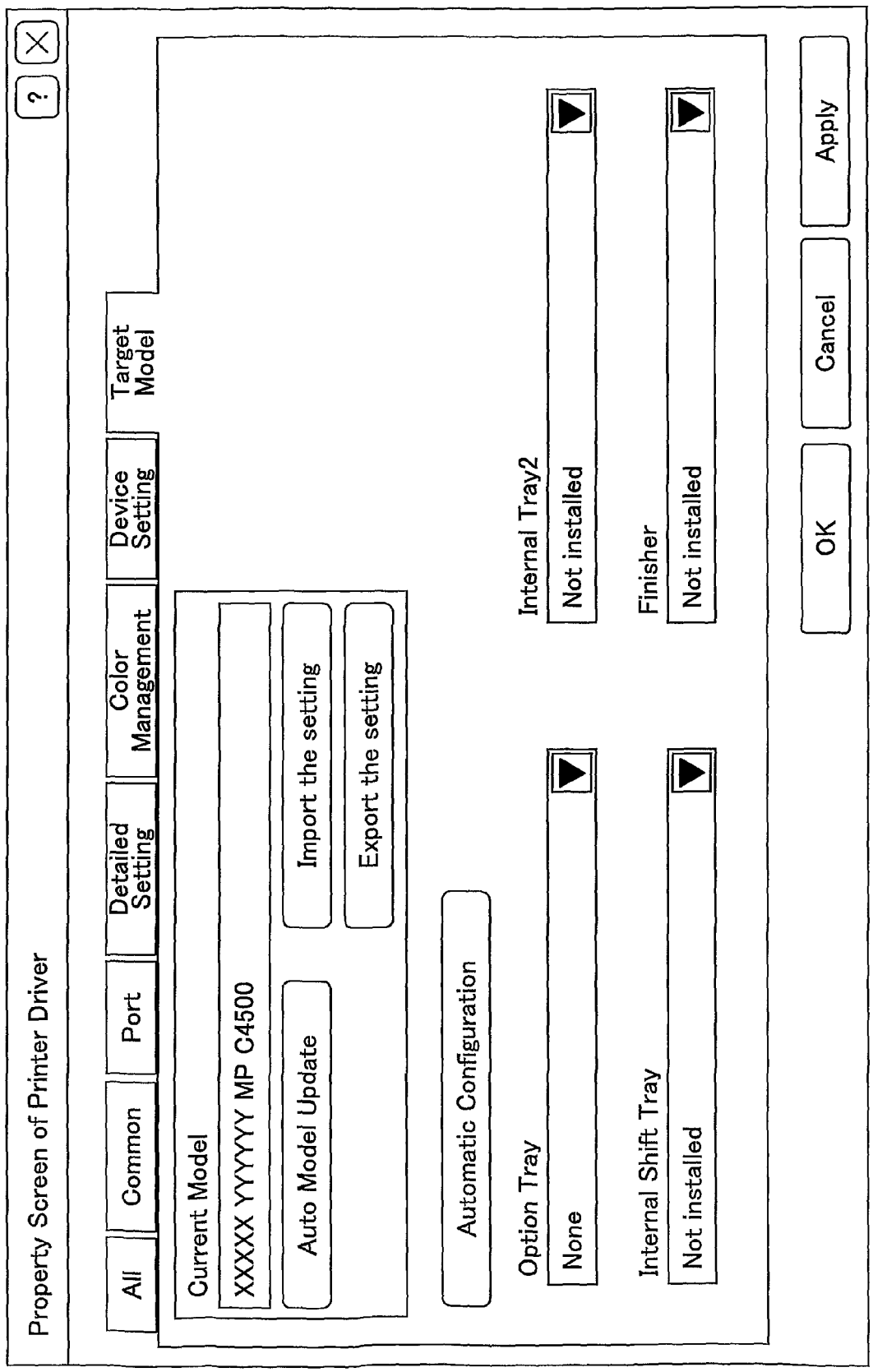
FIG. 4 is a diagram showing an example of a property screen to be displayed on a displaying section shown in FIG. 1.

First, a first case is described. In the first case, for example, as driver functions which are supported by the driver core section 1, "features 1 through 4" have been stored in the function table 12, and "features 2 and 3" have been stored in the MOX 20. When the UI module 10 performs the display processes shown in FIG. 3, the un-supporting function list 13 is empty (no character strings have been stored in the un-supporting function list 13). Therefore, the render module 11 forms a property screen of a printer driver from display data. The property screen shown in FIG. 4 is a screen of a normal case. FIG. 4 is a diagram showing an example of the property screen. In FIG. 4, "features 1 through 4" and "features 2 and 3" are not specifically shown.

Figure 5:
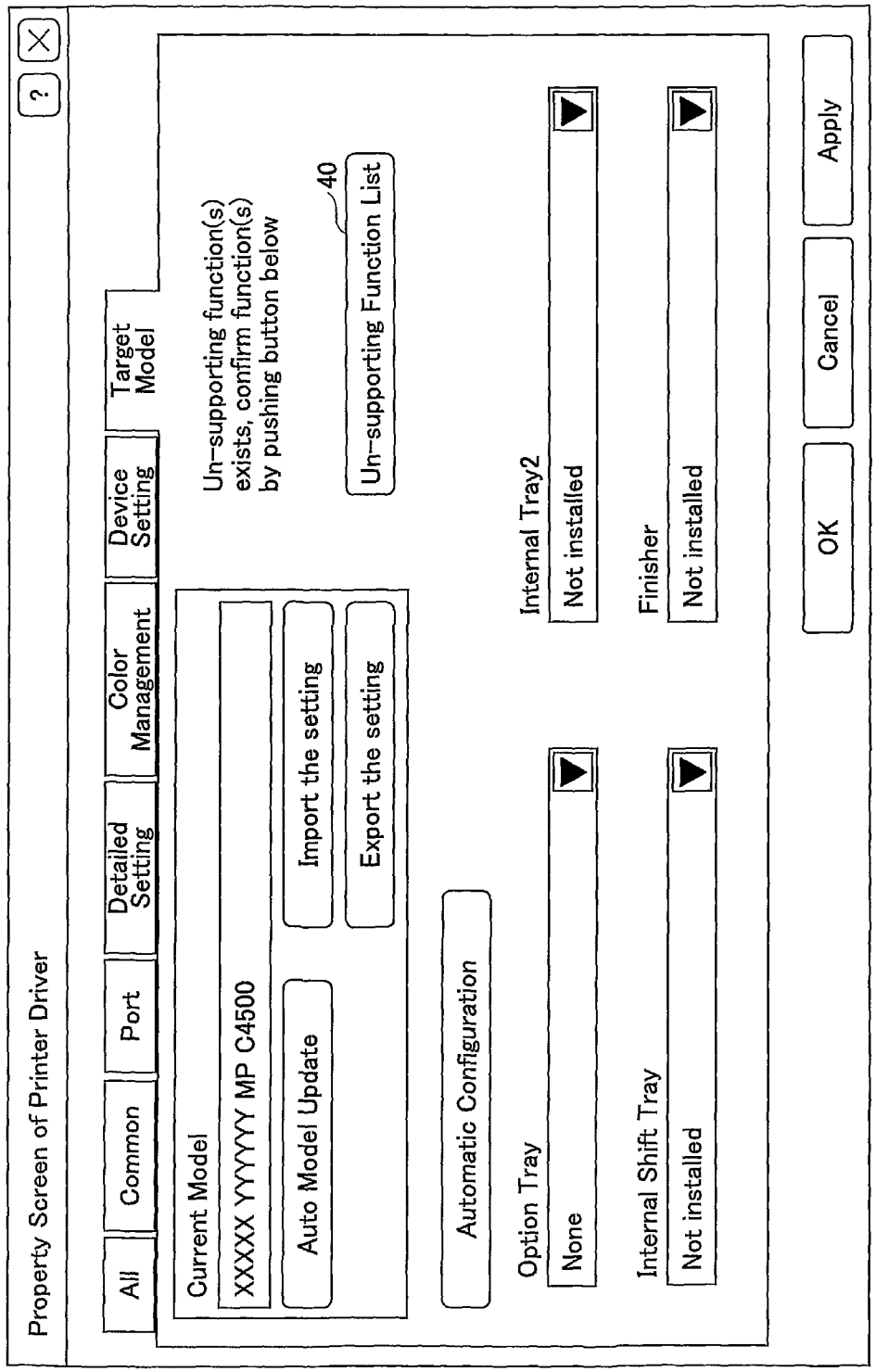
FIG. 5 is a diagram showing another example of the property screen to be displayed on the displaying section shown in FIG. 1.

Next, a second case is described. In the second case, for example, as driver functions which are supported by the driver core section 1, "features 1 through 4" have been stored in the function table 12, and "features 2, 3, and 7 through 10" have been stored in the MOX 20. When the UI module 10 performs the display processes shown in FIG. 3, "features 7 through 10" are stored in the un-supporting function list 13. Therefore, the render module 11 forms a property screen of a printer driver from display data. The property screen shown in FIG. 5 is a screen in which a button 40 of "Un-supporting Function List" is shown. FIG. 5 is a diagram showing another example of the property screen. In FIG. 5, "features 1 through 4" and "features 2, 3, and 7 through 10" are not specifically shown.

In the property screen shown in FIG. 5, a message "Un-supporting function(s) exists, confirm function(s) by pushing button below" and the button 40 are displayed on the property screen.

Figure 6:
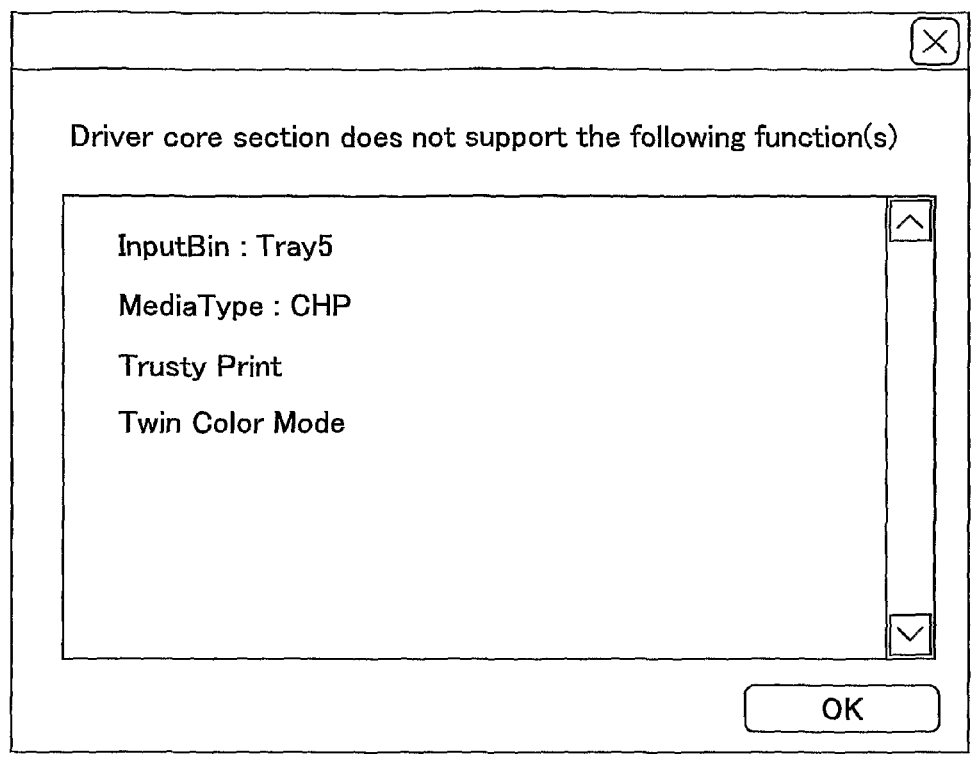
FIG. 6 is a diagram showing an un-supporting function list screen on the property screen to be displayed on the displaying section shown in FIG. 1.

When the button 40 is pushed, an un-supporting function list screen shown in FIG. 6 is displayed on the displaying section 3. By the screen, a user can confirm four un-supporting functions "InputBin:Tray 5", "MediaType:CHP", "Trusty Print", and "Twin Color Mode".

In this case, since the driver core section 1 does not support the four functions in the MOX 20, the four functions are prevented from being used.

As described above, in the driver controlling device according to the embodiment of the present invention, when the driver core section 1 does not support a function(s) of a driver to be used, the function(s) cannot be used, and the un-supporting function(s) is displayed on the displaying section 3 for a user. Since the user can use the functions of the driver supported by the driver core section 1, when a new function of a new driver is not necessary for a user, the user can use the supported functions without installing the new driver in a PC of the user. In addition, the user can understand which functions are not supported by the driver core section 1.

In addition, since the user can use the existing functions supported by the driver core section 1, the user does not need to expend unwanted labor hours for verifying a function(s) of a new driver when the function(s) of the new driver are supported by the driver core section 1.

In addition, when a driver model is changed, it is sufficient that only model dependent data (MOX) of the driver model be changed. Therefore, it is not necessary for the user to change the driver model, and the user does not expend unwanted labor hours for verifying the driver.

In addition, since only the MOX is changed, unwanted data including all function data are not stored in the model dependent data storage unit 2. Therefore, package software of the driver is prevented from being large.

In addition, even if a function of a driver cannot be used temporarily, when the driver core section 1 is updated by installing the function, the function of the driver can be fully used.

Industrial Applicability

The driver controlling device and the driver controlling program according to the embodiment of the present invention can be applied to a driver controlling device for controlling drivers to drive apparatuses such as a facsimile apparatus, a printer, a copying apparatus, a multifunctional peripheral including a facsimile transmitting and receiving function, a printing function, a copying function, and a peripheral of a computer.

Further, the present invention is not limited to the embodiment, but various variations and modifications may be made without departing from the scope of the present invention.

The present invention is based on Japanese Priority Patent Application No. 2008-237792 filed on Sep. 17, 2008, with the Japanese Patent Office, the entire contents of which are hereby incorporated herein by reference.

The invention claimed is:

1. A driver controlling device, comprising:
   a processor;
   a supporting function storing unit which stores information of supportable functions of drivers in a function table;
   a function obtaining unit which obtains information of functions of a new driver to be used described in model dependent data of the new driver;
   a determining unit which determines whether the information of the functions obtained by the function obtaining unit has been stored in the function table;
   a registering unit which registers information of a function that has not been stored in the function table determined by the determining unit in an un-supporting function list;
   a preventing unit which prevents the new driver from using information corresponding to the information of the function which has been registered by the registering unit; and
   a displaying unit which displays the information of the function that has been prevented from being used by the preventing unit.

2. The driver controlling device as claimed in claim 1, wherein if the determining unit makes a determination that there is a particular function of the functions of the new driver that has not been stored in the function table, the displaying unit displays a user interface indicating presence of the particular function of the functions of the new driver that has not been stored in the function table.

3. The driver controlling device as claimed in claim 1, wherein if the determining unit makes a determination that there is a particular function of the functions of the new driver that has not been stored in the function table, the displaying unit displays a user interface indicating information of the particular function of the functions of the new driver that has not been stored in the function table.

4. A non-transitory computer-readable recording medium storing a driver controlling program for controlling a driver controlling device, wherein:
   the driver controlling program includes
   a supporting function storing step which stores information of supportable functions of drivers in a function table;
   a function obtaining step which obtains information of functions of a new driver to be used described in model dependent data of the new driver;
   a determining step which determines whether the information of the functions obtained by the function obtaining step has been stored in the function table;
   a registering step which registers information of a function that has not been stored in the function table determined by the determining step in an un-supporting function list;
   a preventing step which prevents the new driver from using information corresponding to the information of the function which has been registered by the registering step;
   a displaying step which displays the information of the function that has been prevented from being used by the preventing step.

5. The computer-readable recording medium as claimed in claim 4, wherein if the determining step makes a determination that there is a particular function of the functions of the new driver that has not been stored in the function table, the displaying step displays a user interface indicating presence of the particular function of the functions of the new driver that has not been stored in the function table.

6. The computer-readable recording medium as claimed in claim 4, wherein if the determining step makes a determination that there is a particular function of the functions of the new driver that has not been stored in the function table, the displaying step displays a user interface indicating information of the particular function of the functions of the new driver that has not been stored in the function table.

* * * * *